Nov. 9, 1926.
I. SHANKMAN
1,606,323
ILLUMINATED NUMBER PLATE HOLDER
Filed Dec. 30, 1925
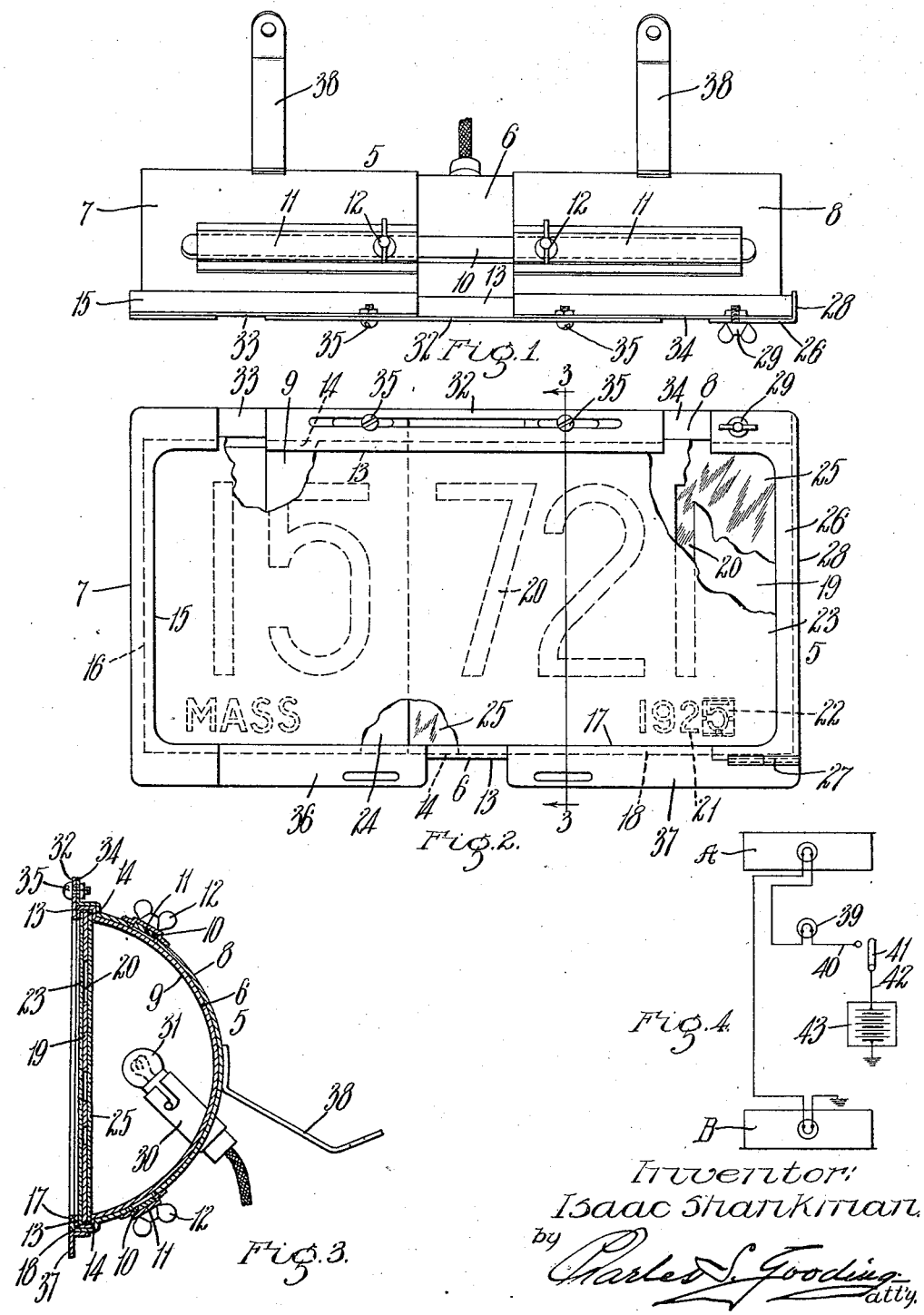

Patented Nov. 9, 1926.

1,606,323

UNITED STATES PATENT OFFICE.

ISAAC SHANKMAN, OF CHELSEA, MASSACHUSETTS.

ILLUMINATED-NUMBER-PLATE HOLDER.

Application filed December 30, 1925. Serial No. 78,260.

This invention relates to an illuminated number plate holder, particularly adapted for use upon motor vehicles, and has for its object to provide a device of the character mentioned and constructed in the form of a casing, the latter embodying therein a central stationary member and a pair of oppositely disposed end members, each of the latter being mounted to slide longitudinally upon the central casing member in a manner to permit number plates of different lengths to be mounted within the holder.

Another object of the invention is to provide the casing members with grooved portions at the front thereof, all of which align with each other in a manner to receive the perforated number plate, a sheet of isinglass in front of the number plate and plates of colored glass at the rear of the number plate, there preferably being a plate of red glass behind a portion of the number plate, and a plate of glass of another color at the rear of the remainder of the number plate, it being a purpose of the invention to utilize that portion of the number plate displaying a red light as the tail light for the motor vehicle.

It is still further an object of the invention to connect a dash light in series with the electric light bulbs that are utilized to illuminate the casing at the rear of the perforated number plates, said dash light always being lit when the number plates are illuminated, thereby constituting a tell-tale light to inform the driver of the motor vehicle that his number plates are properly illuminated.

The invention consists in an illuminated number plate holder as set forth in the following specification and particularly as pointed out in the claim thereof.

Referring to the drawings:—

Figure 1 represents a plan view of a holder for an automobile license number plate embodying my invention.

Fig. 2 is a front elevation of the device, portions thereof being broken away to more clearly illustrate certain parts otherwise obscured.

Fig. 3 is a transverse section taken on the line 3—3 of Fig. 2.

Fig. 4 is a wiring diagram illustrating the manner of connecting the electric light bulbs of two number plate holders in series with a dash lamp, the latter constituting a tell-tale lamp and a visible means of keeping the driver of a motor vehicle informed as to whether the number plates are properly illuminated.

Like numerals refer to like parts throughout the several views of the drawings.

In the drawings, 5 represents a casing embodying therein a central stationary member 6 and a pair of oppositely disposed end members 7 and 8. The casing members are all approximately semi-cylindrical in form and fit closely together, the members 7 and 8 telescoping upon the member 6, being mounted to slide longitudinally upon said latter member. The central casing member 6 has a curved reflecting surface 9 upon the interior thereof and the end casing members 7 and 8 also have similarly shaped reflecting surfaces upon their interior which form continuations of the reflecting surface of the section 6.

The end casing members 7 and 8 are guided during their telescoping movement by guide members 10 constructed in the form of bars which are secured to the periphery of the member 6 at a central point thereon and extend longitudinally thereof. Other guide members 11 are fastened to the periphery of the end members 7 and 8 and extend longitudinally thereof, said guide members 11 being formed of sheet material and closely fitting the guide members 10 and co-operating therewith to guide the casing members upon each other and hold said casing members in alignment with each other. The end members 7 and 8 are held in position relatively to the central casing member 6 by a plurality of thumb screws 12 which extend through the guide members 11 and have clamping engagement with the guide members 10.

The stationary casing member 6 has channel-shaped rim portions 13 formed along the upper and lower front edges thereof, said rim portions forming grooves 14 upon the inner side thereof. The end casing member 7 has a channel-shaped rim portion 15 extending entirely around the front edge thereof and forming a groove 16. The end casing member 8 has a channel-shaped rim portion 17 formed along the lower front edge thereof and forming a groove 18 upon the inner side thereof. The grooves 14, 16 and 18 are all located in alignment with each other and co-operate in forming a continuous groove extending approximately around three sides of the casing 5 and in this groove is located a license number plate 19 for a motor vehicle, said number plate being perforated as at 20 to form the numerals representing the license number. A perforated year number 21 provided upon the plate 19 has one number thereof located in a separate plate 22 which is interchangeable upon the main number plate 19, and this plate 22 is changed once a year providing the owner of the motor vehicle has the same license number upon consecutive years.

Also located in the groove in front of the number plate 19 is a thin sheet of a suitable transparent material 23, such as isinglass, and located behind the number plate 19 are two plates 24 and 25 of colored glass, said plates being located edge to edge within said groove. The plate 24 covers approximately one-half of the surface of the number plate 19 and is preferably formed of red glass and may, if it is so desired, be utilized as a tail light for the motor vehicle, and it is evident that a circular perforation may be formed in the number plate 19 in addition to the numerals that are perforated therein in order that said tail light may display a greater amount of light if it is so desired. The plate 25 is preferably formed of green, blue or yellow glass.

A number plate 19, sheet of isinglass 23 and plates of colored glass 24 and 25 are all inserted within the grooves of the various casing members through the outer end of the casing member 8, and an angle plate 26 is pivotally mounted at 27 at the front of the end member 8, said angle plate being provided with a rearwardly extending flange 28 which projects beyond the end of said plates 19, 23, 24 and 25 and holds the same in place. The angle plate 26 is clamped to the top of the end member 8 by a thumb screw 29.

The stationary casing member 6 has a lamp socket 30 mounted therein at a central point thereon, and located within said lamp socket is an electric light bulb 31 of well known construction. The electric light bulb 31 illuminates the interior of the casing 5 and the rays of light are reflected by the reflecting surfaces 9 of the various casing members through the apertures in the number plate 19.

The central casing member 6 has a flange 32 projecting upwardly from the front thereof and the end casing members 7 and 8 have similar flanges 33 and 34 respectively also projecting upwardly from the front thereof, and said flanges are clamped securely together by a pair of screws 35. The end casing members 7 and 8 have flanges 36 and 37 respectively projecting downwardly from the lower front face thereof, and said flanges may be utilized in securing other plates or objects that may be desired to the casing 5. Brackets 38 are fastened to the casing members 7 and 8 at the rear thereof, said brackets being employed for the purpose of securing the casing 5 to the motor vehicle.

It is evident that similar holders should be located at the front and rear of a motor vehicle and in Figure 4 I have illustrated diagrammatically a manner of electrically connecting the electric light bulbs of a front casing A and rear casing B in series with another lamp bulb 39 which may be located upon the dashboard of the motor vehicle, said electric light bulbs all being connected in series, so that if one of the number plates is not illuminated, the dash lamp 39 will act as a tell-tale light to signify to the driver of the motor vehicle that the number plates are not properly illuminated. A wire 40 from the dash lamp 39 runs to a switch 41 and the latter is connected by a wire 42 to a storage battery 43 which is grounded in the usual well known manner to the frame of the motor vehicle.

In adjusting the device of this invention to receive the various lengths of number plates, the casing members 7 and 8 are moved longitudinally upon the central casing member 6 as required to receive the number plate, the latter being removed and inserted through the outer end of the end member 8, and being held within the holder by the angle plate 26. During the telescoping movement of the various casing members, the members 7 and 8 are guided upon the central casing member 6 by the guide members 10 and 11 and when properly adjusted, the various casing members are all securely clamped together by the thumb screws 12. The various casing members are also clamped together at the top thereof by the screws 35. When the interior of the casing 5 is illuminated by manipulating the switch 41, the number plate 19 will be brightly illuminated, and the license number of the motor vehicle will be clearly displayed.

I claim:—

A device of the class described comprising, in combination, a casing embodying therein a central stationary member, and a pair of oppositely disposed end members slidably mounted upon said stationary member, a bar fast to the periphery of said stationary casing member and extending longitudinally thereof, means fast to said end members and slidable upon said bar and adapted to guide said end members upon said stationary member, means to clamp said end members to said stationary member, each of said casing members having grooves provided at the front thereof aligning with each other, a perforated number plate mounted in said grooves, an angle plate pivotally mounted upon one of said end members and adapted to hold said number plate in said grooves, and means to illuminate the interior of said casing.

In testimony whereof I have hereunto set my hand.

ISAAC SHANKMAN.